United States Patent
Philpott

(10) Patent No.: US 8,857,575 B2
(45) Date of Patent: Oct. 14, 2014

(54) BRAKE CALIPER ASSEMBLY HAVING A PAD SHIELD

(71) Applicant: ArvinMeritor Technology, LLC, Troy, MI (US)

(72) Inventor: Daniel Philpott, Oxford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 8 days.

(21) Appl. No.: 13/710,578

(22) Filed: Dec. 11, 2012

(65) Prior Publication Data

US 2014/0158481 A1 Jun. 12, 2014

(51) Int. Cl.
*F16D 65/40* (2006.01)

(52) U.S. Cl.
USPC ............. 188/73.38; 188/218 A; 188/71.1

(58) Field of Classification Search
CPC ............ F16D 65/0006; F16D 65/0025; F16D 65/0081; F16D 65/0977; F16D 2055/0037; F16D 2055/0041; F16D 2065/1396
USPC ............. 188/73.35–73.38, 218 A, 71.1
See application file for complete search history.

(56) References Cited

U.S. PATENT DOCUMENTS

| | | | | |
|---|---|---|---|---|
| 3,433,328 A | * | 3/1969 | Swift | 188/72.4 |
| 3,625,316 A | * | 12/1971 | Mori | 188/73.35 |
| 3,937,304 A | * | 2/1976 | Brix | 188/73.38 |
| 4,039,054 A | * | 8/1977 | Rath | 188/73.43 |
| 6,910,555 B2 | * | 6/2005 | Ciotti et al. | 188/73.47 |
| 7,438,160 B2 | * | 10/2008 | Maehara | 188/73.31 |
| D645,802 S | * | 9/2011 | Henning | D12/180 |
| 2006/0042890 A1 | * | 3/2006 | Samuelsson | 188/73.1 |
| 2008/0110707 A1 | | 5/2008 | Kromer | |

FOREIGN PATENT DOCUMENTS

| | | | | |
|---|---|---|---|---|
| DE | 102009023104 A | * | 10/2009 | F16D 55/22 |
| JP | 10153226 A | * | 6/1998 | F16D 55/224 |

* cited by examiner

*Primary Examiner* — Xuan Lan Nguyen
(74) *Attorney, Agent, or Firm* — Brooks Kushman P.C.

(57) ABSTRACT

A brake caliper assembly having a pad shield. The pad shield may have an inboard channel, an outboard channel, and a gutter. The gutter may be disposed between the inboard and outboard channels.

13 Claims, 4 Drawing Sheets

BRAKE CALIPER ASSEMBLY HAVING A PAD SHIELD

TECHNICAL FIELD

This application relates to a brake caliper assembly having a pad shield.

BACKGROUND

A pad shield that is mountable on a caliper is disclosed in U.S. Patent Publication No. 2008/0110707.

SUMMARY

In at least one embodiment, a brake caliper assembly is provided. The brake caliper assembly may include a housing assembly, a first brake pad assembly, and a pad shield. The housing assembly may have an opening. The first brake pad assembly may be disposed proximate the housing assembly. The first brake pad assembly may have a backing plate and a friction material disposed on the backing plate. The backing plate may have an inboard tab and an outboard tab. The pad shield may be disposed in the opening. The pad shield may have an inboard channel, an outboard channel that is spaced apart from the inboard channel, and a gutter that is disposed between the inboard and outboard channels. The inboard and outboard tabs may be disposed in the inboard and outboard channels, respectively.

In at least one embodiment, a brake caliper assembly is provided. The brake caliper assembly may include a housing assembly that has an opening, first and second brake pad assemblies, and a pad shield. The first and second brake pad assemblies may each include a backing plate that has an inboard tab. The pad shield may be disposed in the opening and may have an inboard channel and a tab slot. The inboard channel may receive the inboard tab of the first brake pad assembly. The tab slot may receive the inboard tab of the second brake pad assembly.

In at least one embodiment, a brake caliper assembly is provided. The brake caliper assembly may include first and second brake pad assemblies and a pad shield. The pad shield may have first and second end surfaces, a center portion, first and second inboard channels, first and second outboard channels, and first and second gutters. The center portion may be disposed between the first and second end surfaces. The first and second inboard channels may be disposed on opposite sides of the center portion. The first outboard channel may be disposed between the first end surface and the first inboard channel. The second outboard channel may be disposed between the second end surface and the second inboard channel. The first gutter may be disposed between the first inboard channel and the first outboard channel. The second gutter may be disposed between the second inboard channel and the second outboard channel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
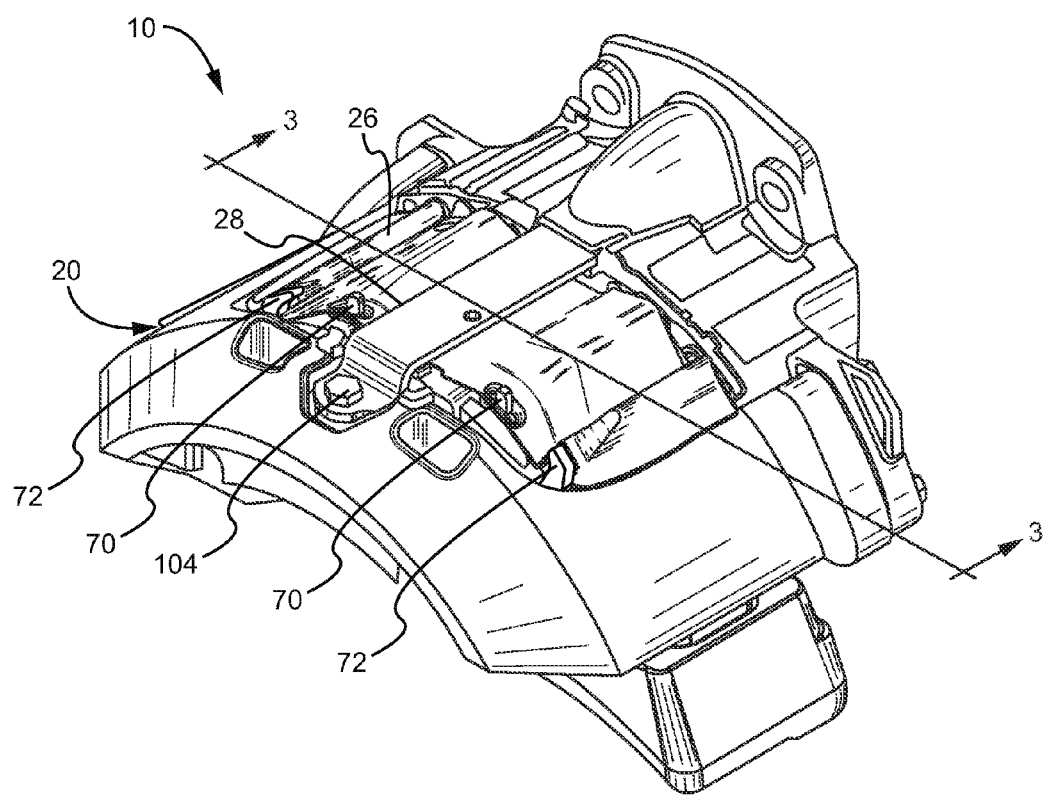
FIG. 1 is a perspective view of a brake caliper assembly.
Figure 2:
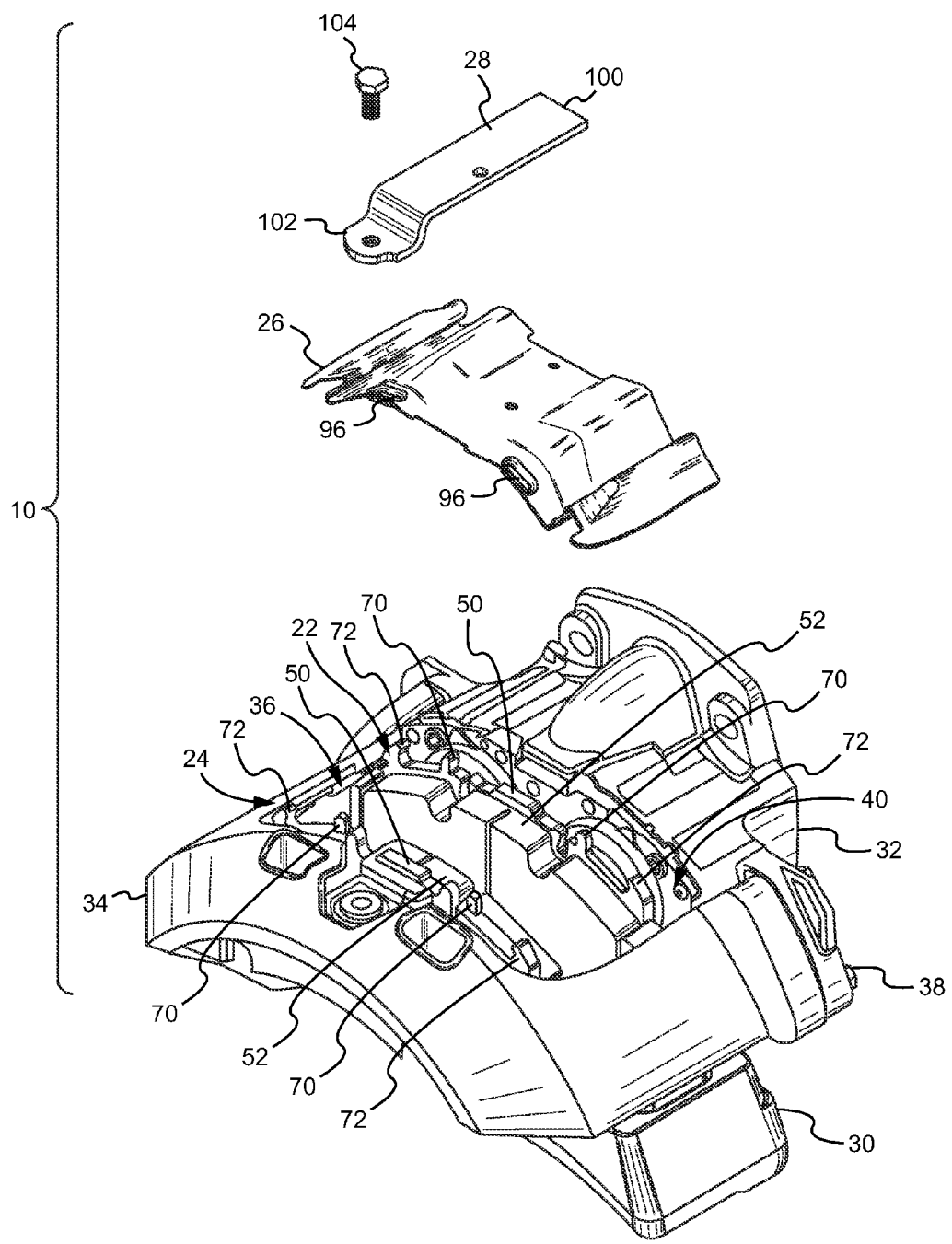
FIG. 2 is a partially exploded view of the brake caliper assembly.

Referring to FIGS. 1 and 2, an exemplary brake caliper assembly 10 is shown. The brake caliper assembly 10 may be provided as part of a vehicle, such as a motor vehicle like a truck, bus, farm equipment, military transport or weaponry vehicle, or cargo loading equipment for land, air, or marine vessels. In at least one embodiment, the brake caliper assembly 10 may include a housing assembly 20, a first brake pad assembly 22, a second brake pad assembly 24, a pad shield 26, and a retainer bracket 28.

The housing assembly 20 may receive various components of the brake caliper assembly 10. In addition, the housing assembly 20 may facilitate positioning of the first and second brake pad assemblies 22, 24 with respect to a rotor, also known as a brake disc, to facilitate braking of the vehicle. In at least one embodiment, the housing assembly 20 may include a carrier 30, a caliper housing 32, and a caliper bridge 34.

The carrier 30 may be fixedly mounted to the vehicle. For example, the carrier 30 may be connected to an axle or steering knuckle, such as with an intermediate component like a torque plate in one or more embodiments. The carrier 30 may receive and/or support the first and second brake pad assemblies 22, 24 and may include a rotor opening 36 that may be configured to receive the rotor. As such, the carrier 30 may straddle the rotor and help position the first and second brake pad assemblies 22, 24 on opposite sides of the rotor.

The caliper housing 32 may be movably disposed on the carrier 30. For example, the caliper housing 32 may be slidably disposed on a pair of slide pins that may be fixedly disposed on the carrier 30. The caliper housing 32 may receive at least one piston that may actuate the first and second brake pad assemblies 22, 24 into engagement with the rotor. More specifically, the piston may actuate the first brake pad assembly 22 toward the rotor and move the caliper housing 32 and caliper bridge 34 to actuate the second brake pad assembly 24 toward the rotor. The piston may be pneumatically actuated in one or more embodiments.

The caliper bridge 34 may be integrally formed with or may be fixedly disposed on the caliper housing 32. For example, the caliper bridge 34 may be coupled to the caliper housing 32 with one or more fasteners 38, such as a bolt. The caliper bridge 34 may cooperate with the caliper housing 32 to at least partially define an opening 40. In at least one embodiment, the first and second brake pad assemblies 22, 24, pad shield 26, and/or retainer bracket 28 may be at least partially disposed in the opening 40.

The first and second brake pad assemblies 22, 24 may be configured to engage opposite sides of the rotor to slow the rotation of a vehicle wheel. The first and second brake pad assemblies 22, 24 may have similar or identical configurations. In at least one embodiment, the first and second brake pad assemblies 22, 24 may include a backing plate 50 and a friction material 52.

Figure 3:
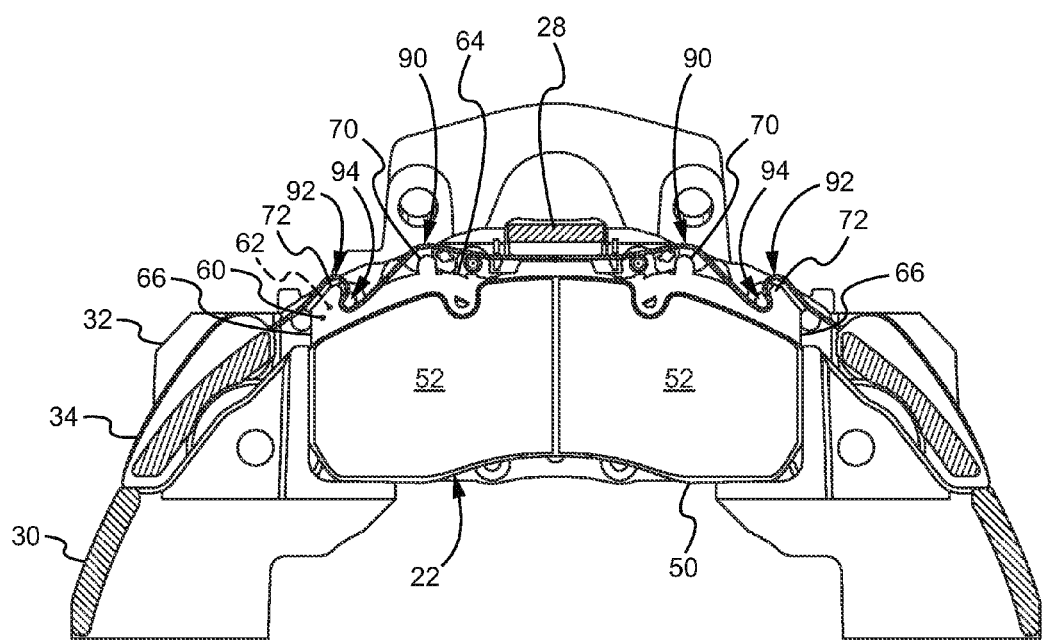
FIG. 3 is a section view of the brake caliper assembly along section line 3-3.

Referring to FIGS. 2 and 3, the backing plate 50 may be a structural member of a brake pad assembly 22, 24. The backing plate 50 may be made of any suitable material, such as a metal or metal alloy. In at least one embodiment, the backing plate 50 may include a first surface 60, a second surface 62, a third surface 64, and a pair of opposing side surfaces 66. The first surface 60 may be disposed opposite the second surface 62. The third surface 64 may extend from the first surface 60 to the second surface 62. One or more inboard tabs 70 and one or more outboard tabs 72 may extend from the third surface 64 toward the pad shield 26. In the embodiment shown, two inboard tabs 70 and two outboard tabs 72 are provided. The inboard tabs 70 may be located near the center of the backing plate 50. The outboard tabs 72 may be spaced apart from the inboard tabs 70 and may be disposed adjacent to or near each side surface 66.

The friction material 52 may be disposed on the backing plate 50. More specifically, the friction material 52 may be fixedly disposed on the first surface 60 of the backing plate 50. The friction material 52 may face toward the rotor and may engage the rotor during vehicle braking.

Figure 4:
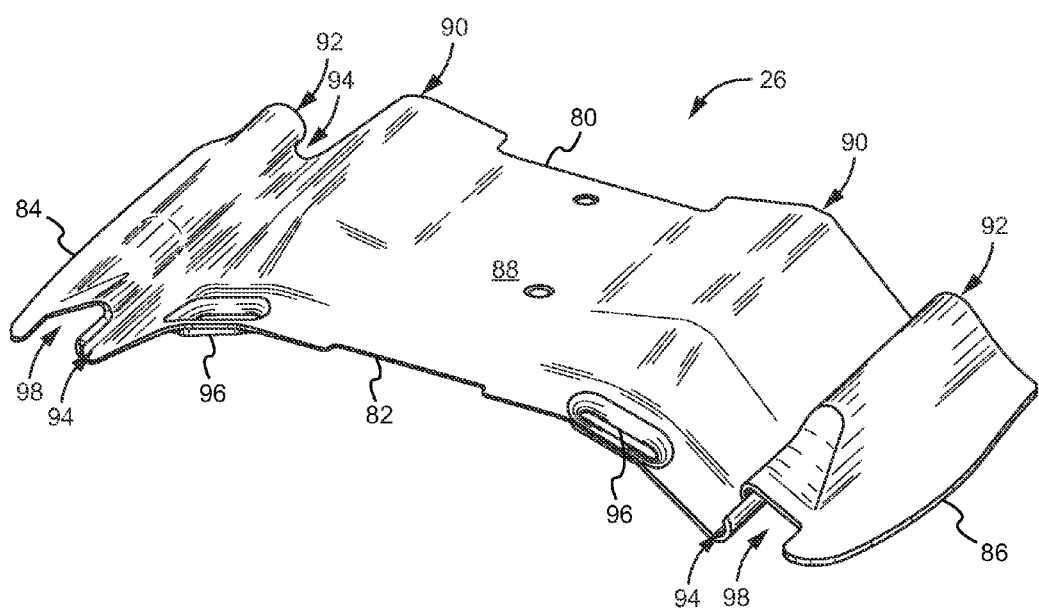
FIG. 4 is a perspective view of a pad shield.

Referring to FIGS. 3 and 4, the pad shield 26 may be disposed in the opening 40 and may be made of any suitable material, such as a metal alloy like stainless steel or carbon fiber. In at least one embodiment, the pad shield 26 may include a first side 80, a second side 82, a first end surface 84, a second end surface 86, a center portion 88, an inboard channel 90, an outboard channel 92, and a gutter 94.

The first side 80 may face toward the caliper housing 32. In at least one embodiment, the first side 80 may be spaced apart from the caliper housing 32.

The second side 82 may be disposed opposite the first side 80. For example, the second side 82 may face toward the caliper bridge 34. In at least one embodiment, the second side 82 may be spaced apart from the caliper bridge 34.

The first end surface 84 may extend from the first side 80 toward the second side 82. The first end surface 84 may be disposed in the opening 40 and may be spaced apart from the housing assembly 20. In addition, the first end surface 84 may be generally disposed between the housing assembly 20 and the ends of the first and second brake pad assemblies 22, 24 in one or more embodiments.

The second end surface 86 may be disposed opposite the first end surface 84. The second end surface 86 may extend from the first side 80 toward the second side 82. The second end surface 86 may be disposed in the opening 40 and may be spaced apart from the housing assembly 20. In addition, the second end surface 86 may be generally disposed between the housing assembly 20 and the ends of the first and second brake pad assemblies 22, 24 in one or more embodiments.

The center portion 88 may be disposed near the center of the pad shield 26. The center portion 88 may extend from the first side 80 to the second side 82. In addition, the center portion 88 may be disposed between and may be spaced apart from the first and second end surfaces 84, 86. The center portion 88 may be generally disposed between the first and second brake pad assemblies 22, 24 and the retainer bracket 28 in one or more embodiments. In at least one embodiment, the center portion 88 may be provided without any holes or openings to help shield the friction material 52 of the first and second brake pad assemblies 22, 24 from water. Alternatively, the center portion 88 may be provided with one or more holes or windows that may facilitate visual inspection of the positioning of the first and/or second brake pad assemblies 22, 24 and/or inspection of the thickness of the friction material 52. A window, if provided, may be transparent or semitransparent and may generally extend from the first side 80 toward the second side 82 in one or more embodiments.

One or more inboard channels 90 may be disposed proximate the center portion 88. In the embodiment shown, two inboard channels 90 are located on opposite sides of the center portion 88 that extend generally parallel to each other. The inboard channel 90 may extend from the first side 80 toward the second side 82. In the embodiment shown, the inboard channels 90 are spaced apart from the second side 82. Alternatively, an inboard channel 90 may extend to the second side 82 in one or more embodiments. As is best shown in FIG. 3, the inboard channel 90 may have a convex cross section and may extend above the center portion 88. The inboard channel 90 may be located further away from the friction material 52 than the center portion 88. Moreover, each inboard channel 90 may include regions that may generally slope downward toward the center portion 88 and a gutter 94 from the perspective shown. Each inboard channel 90 may receive an inboard tab 70 of the first brake pad assembly 22. In at least one embodiment, the inboard tabs 70 may be spaced apart from the inboard channel 90 to help reduce friction between the backing plate 50 and pad shield 26 to help facilitate movement of the first brake pad assembly 22.

One or more outboard channels 92 may also be provided with the pad shield 26. In the embodiment shown, two outboard channels 92 are shown that extend generally parallel to each other such that a first outboard channel 92 is disposed between the first end surface 84 and a first inboard channel 90 and a second outboard channel 92 is disposed between the second end surface 86 and a second inboard channel 90. The outboard channel 92 may be spaced apart from the inboard channel 90 and may extend from the first side 80 toward the second side 82. In the embodiment shown, the outboard channels 92 are spaced apart from the second side 82. Alternatively, an outboard channel 92 may extend to the second side 82 in one or more embodiments. As is best shown in FIG. 3, the outboard channel 92 may have a convex cross section and may extend away from the first and/or second brake pad assemblies 22, 24. Each outboard channel 92 may receive an outboard tab 72 of the first brake pad assembly 22. In at least one embodiment, the outboard tabs 72 may engage a surface that at least partially defines the outboard channel 92.

One or more gutters 94 may be provided with the pad shield 26 to help direct water away from the friction material 52 of the first and second brake pad assemblies 22, 24. A gutter 94 may extend from the first side 80 to the second side 82 and may or may not slope downward toward the housing assembly 20. As such, a gutter 94 may route water toward the first and/or second sides 80, 82 and away from the rotor in one or more embodiments. A gutter 94 may be disposed between an inboard channel 90 and an outboard channel 92 and may extend generally parallel to an inboard channel 90 and/or an outboard channel 92 in one or more embodiments. In the embodiment shown, two gutters 94 are shown that extend generally parallel to each other such that a first gutter 94 is disposed between the inboard and outboard channels 90, 92 located closest to the first end surface 84 and a second gutter 94 is disposed between the inboard and outboard channels 90, 92 located closest to the second end surface 86. As is best shown in FIG. 3, a gutter 94 may be disposed closer to the friction material 52 than the inboard or outboard channels 90, 92. In at least one embodiment, a gutter 94 may be disposed adjacent to an outboard channel 92. In addition, the outboard channel 92 and gutter 94 may include curved surfaces such that a generally S-shaped cross-section may be provided.

One or more tabs slots 96 may be provided with pad shield 26. In the embodiment shown, two tab slots 96 are provided. Each tab slot 96 may be disposed between the second side 82 and an inboard channel 90 and between the center portion 88 and a gutter 94 in one or more embodiments. Each tab slot 96 may be spaced apart from the inboard channel 90 and the second side 82. Alternatively, a tab slot 96 may not be spaced apart from the second side 82 in one or more embodiments. A tab slot 96 may receive an inboard tab 70 of the second brake pad assembly 24 when the second brake pad assembly 24 is properly oriented (e.g., with the friction material 52 of the second brake pad assembly 24 facing the first brake pad assembly 22 and the inboard tabs 70 facing toward the pad shield 26). As such, the tab slots 96 may help facilitate proper installation of the second brake pad assembly 24.

One or more tab openings 98 may also be provided with the pad shield 26. In the embodiment shown, two tab openings 98 are provided. Each tab opening 98 may be disposed adjacent to the second side 82 and an outboard channel 92. A tab opening 98 may or may not be spaced apart from the second side 82 and outboard channel 92. In the embodiment shown, each tab opening 98 is spaced apart from a corresponding outboard channel 92 and configured as a notch that extends from the second side 82. The tab openings 98 may also be disposed adjacent to a gutter 94 or between a gutter 94 and a nearby end surface, such as the first end surface 84 or second end surface 86. Each tab opening 98 may receive an outboard tab 72 of the second brake pad assembly 24.

The retainer bracket 28 may be disposed on the housing assembly 20. The retainer bracket 28 may engage the center portion 88 of the pad shield 26 and may have a first end 100 and a second end 102. The first end 100 may engage or may be received in a notch in the caliper housing 32. The second end 102 may be disposed opposite the first end 100 and may be fixedly disposed on the caliper bridge 34. For example, the second end 102 may engage the caliper bridge 34, and may have a hole that receives a fastener 104, such as a bolt, that may couple the retainer bracket 28 to the caliper bridge 34.

The pad shield 26 and retainer bracket 28 may cooperate to exert a load force against the first and/or second brake pad assemblies 22, 24. More specifically, the retainer bracket 28 may exert force on the pad shield 26, which in turn may exert force on the first and/or second brake pad assemblies 22, 24 to help position the first and/or second brake pad assemblies 22, 24 within the housing assembly 20 and inhibit movement toward or away from the pad shield 26 to help improve friction material life and reduce noise. Such a configuration may allow brake pad springs to be omitted from the brake caliper assembly 10. A brake pad spring may resemble the leaf spring and may be a separate component that may be provided on the third surface 64 between a backing plate and a pad shield. Such brake pad springs may be hard to see under a pad shield and may be mispositioned or inadvertently omitted during assembly. The elimination of brake pad springs eliminates brake pad spring misassembly, reduces the number of parts provided with a brake caliper assembly 10, and reduces associated costs. In addition, the pad shield 26 may be configured as a standardized component that may be used in different brake assemblies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake caliper assembly comprising:
    a housing assembly that has an opening;
    first and second brake pad assemblies disposed proximate the housing assembly, the first and second brake pad assemblies each having a backing plate that has an inboard tab;
    a pad shield disposed in the opening, the pad shield including:
        an inboard channel that receives the inboard tab of the first brake pad assembly, and
        a tab slot that receives the inboard tab of the second brake pad assembly; and
    a retainer bracket that couples the pad shield to the housing assembly, wherein the retainer bracket and pad shield cooperate to exert a load force against the second brake pad assembly.

2. The brake caliper assembly of claim 1 wherein the pad shield is spaced apart from the housing assembly.

3. The brake caliper assembly of claim 1 wherein the pad shield has a first side and a second side disposed opposite the first side, wherein the inboard channel extends from the first side toward the second side and the tab slot is spaced apart from the inboard channel and is disposed between the inboard channel and the second side.

4. The brake caliper assembly of claim 1 wherein each backing plate further comprises an outboard tab and the pad shield further comprises an outboard channel that receives the outboard tab of the first brake pad assembly.

5. The brake caliper assembly of claim 4 wherein the pad shield has a tab opening that receives the outboard tab of the second brake pad assembly.

6. The brake caliper assembly of claim 5 wherein the pad shield has a first side and a second side disposed opposite the first side, wherein the outboard channel extends from the first side toward the second side and the tab opening extends from the second side and is spaced apart from the outboard channel.

7. The brake caliper assembly of claim 5 wherein the pad shield includes a gutter that is disposed between the inboard and outboard channels.

8. The brake caliper assembly of claim 7 wherein the gutter is disposed closer to a friction material of the first brake pad assembly than the inboard and outboard channels.

9. The brake caliper assembly of claim 7 wherein the gutter extends substantially parallel to the inboard and outboard channels.

10. The brake caliper assembly of claim 7 wherein the gutter is disposed adjacent to the outboard channel and the tab opening.

11. A brake caliper assembly comprising:
    first and second brake pad assemblies; and
    a pad shield disposed proximate the first and second brake pad assemblies, the pad shield including:
        first and second end surfaces,
        a center portion disposed between the first and second end surfaces,
        first and second inboard channels disposed on opposite sides of the center portion,
        first and second outboard channels, wherein the first outboard channel is disposed between the first end surface and the first inboard channel and the second outboard channel is disposed between the second end surface and the second inboard channel; and
        first and second gutters, wherein the first gutter is disposed between the first inboard channel and the first outboard channel and the second gutter is disposed between the second inboard channel and the second outboard channel; and
    a housing assembly and a retainer bracket that couples the pad shield to the housing assembly, wherein the retainer bracket and pad shield cooperate to exert a load force against the second brake pad assembly.

12. The brake caliper assembly of claim 11 wherein the first brake pad assembly has a backing plate that has first and second inboard tabs and first and second outboard tabs, wherein the first and second inboard tabs of the first brake pad assembly are disposed in the first and second inboard channels, respectively, and the first and second outboard tabs are disposed in the first and second outboard channels, respectively.

13. The brake caliper assembly of claim 12 wherein the second brake pad assembly has a backing plate that has first and second inboard tabs and first and second outboard tabs, wherein the first and second inboard tabs of the second brake pad assembly are spaced apart from the first and second inboard channels, respectively, and the first and second outboard tabs are spaced apart from the first and second outboard channels, respectively.

\* \* \* \* \*